US010030536B2

(12) United States Patent
Brookes

(10) Patent No.: US 10,030,536 B2
(45) Date of Patent: Jul. 24, 2018

(54) ICING PREVENTION OF A GAS TURBINE ENGINE PRESSURE SENSING ASSEMBLY

(71) Applicant: ROLLS-ROYCE PLC, London (GB)

(72) Inventor: David Brookes, Derby (GB)

(73) Assignee: ROLLS-ROYCE PLC, London (GB)

( * ) Notice: Subject to any disclaimer, the term of this patent is extended or adjusted under 35 U.S.C. 154(b) by 242 days.

(21) Appl. No.: 14/953,198

(22) Filed: Nov. 27, 2015

(65) Prior Publication Data

US 2016/0237847 A1  Aug. 18, 2016

(30) Foreign Application Priority Data

Feb. 25, 2015 (GB) .................................. 1503138.8

(51) Int. Cl.
G01M 15/14 (2006.01)
F01D 25/02 (2006.01)
F01D 17/08 (2006.01)
G01L 19/00 (2006.01)

(52) U.S. Cl.
CPC ............ F01D 25/02 (2013.01); F01D 17/08 (2013.01); G01L 19/00 (2013.01)

(58) Field of Classification Search
USPC ...................................................... 73/112.01
See application file for complete search history.

(56) References Cited

U.S. PATENT DOCUMENTS

| 4,601,202 A | 7/1986 | Colman et al. |
| 5,458,008 A | 10/1995 | Rassatt |
| 6,414,282 B1 | 7/2002 | Ice et al. |
| 7,597,018 B2 | 10/2009 | Braun et al. |
| 2005/0050877 A1* | 3/2005 | Venkataramani ....... F02C 7/047 60/39.093 |
| 2006/0090472 A1* | 5/2006 | Ritland ................... F02C 7/047 60/772 |
| 2006/0138280 A1* | 6/2006 | Markwart .............. B64D 13/06 244/129.1 |
| 2009/0120099 A1* | 5/2009 | Brand ..................... F01D 25/02 60/785 |
| 2012/0312925 A1 | 12/2012 | Asfia et al. |
| 2014/0165531 A1* | 6/2014 | Broughton ................ F02C 7/12 60/39.093 |

(Continued)

FOREIGN PATENT DOCUMENTS

| EP | 1884625 A2 | 2/2008 |
| EP | 1942249 A2 | 7/2008 |

(Continued)

Primary Examiner — Eric S McCall
(74) Attorney, Agent, or Firm — Oliff PLC

(57) ABSTRACT

A combination of a gas turbine pressure sensing assembly and an engine electronics unit. The pressure sensing assembly includes a pressure manifold having an air inlet and one or more air outlets. The pressure sensing assembly further includes one or more pressure sensors connected to the air outlets to sense the pressure of air entering through the air inlet. The engine electronics unit in operation produces waste heat. The pressure sensing assembly further includes a heat conduction path which thermally connects the engine electronics unit to the manifold such that the manifold acts as a sink for the waste heat. The temperature rise of the manifold produced by the waste heat preventing icing of the manifold.

18 Claims, 3 Drawing Sheets

(56) References Cited

U.S. PATENT DOCUMENTS

2017/0051668 A1* 2/2017 Kraft ...................... F02C 7/047

FOREIGN PATENT DOCUMENTS

| EP | 2 631 437 A2 | 8/2013 |
|----|---|---|
| GB | 2152147 A | 7/1985 |
| GB | 2435521 A | 8/2007 |
| WO | 2005/073539 A1 | 8/2005 |

* cited by examiner

ICING PREVENTION OF A GAS TURBINE ENGINE PRESSURE SENSING ASSEMBLY

FIELD OF THE INVENTION

The present invention relates to icing prevention of a gas turbine engine pressure sensing assembly.

BACKGROUND

As part of the control for a gas turbine engine there is often a need to measure pressures at different points of the engine. Pneumatic pressure signals are routed to pressure sensing assemblies via pipes and connected to pressure manifolds of the assemblies.

In such assemblies, efforts are made to avoid moisture propagation down the pipes as this can affect the pressure readings.

As the operating environment of the engine mounted pressure sensing assemblies is generally not controlled, there is potential for residual moisture to form ice either within the sensors of an assembly or within its manifold. Ice within the sensors can lead to a pressure measurement error or a damaged sensor. Ice within the manifold can block the pressure signal leading to fault messages from the sensor. However, when investigated further, such messages can lead to 'fault not found' issues, since once the assembly has returned to ambient temperature any ice that had formed will have melted and any residual moisture evaporated.

To protect against this issue some pressure sensors contain in-built heaters that may be used to raise the internal sensor temperature and thereby preventing the formation of ice. Adding heaters to the pressure sensors reduces the possibility of ice causing a pressure reading error but does not rule out the possibility of blockages in the pressure manifold. Additional power, which can be as high as 5 W per sensor, is also required to drive the sensor heaters. The activation of heaters within pressure sensor assemblies also leads to a thermal shock, potentially reducing sensor reliability.

SUMMARY

In a first aspect, the present invention provides a combination of a gas turbine engine pressure sensing assembly and an engine electronics unit, the pressure sensing assembly having:
a pressure manifold having an air inlet and one or more air outlets; and
one or more pressure sensors connected to the air outlets for sensing the pressure of air entering through the air inlet;
wherein the engine electronics unit in operation produces waste heat; and
the pressure sensing assembly further has a heat conduction path which thermally connects the engine electronics unit to the manifold such that the manifold acts as a sink for the waste heat, the temperature rise of the manifold produced by the waste heat preventing icing of the manifold.

Advantageously, the pressure sensing assembly can thus avoid a need for ancillary heaters within the pressure sensors. The heating of the manifold is also passive, and does not require monitoring of temperatures or switching of heating elements, removing the need for software or hardware control.

In a second aspect, the present invention provides a gas turbine engine having the combination of the first aspect.

In a third aspect, the present invention provides a method of preventing icing of a pressure manifold of a gas turbine engine pressure sensing assembly, the method including:
providing the combination of the first aspect; and
using waste heat from the engine electronics unit to raise the temperature of the manifold.

Optional features of the invention will now be set out. These are applicable singly or in any combination with any aspect of the invention.

The engine electronics unit may have a power supply sub-unit which produces the waste heat.

The engine electronics unit has a primary function, e.g. controlling and/or monitoring the engine, which is not to heat the pressure manifold. The heating of the pressure manifold by waste heat produced, for example, by the engine electronics unit's power supply sub-unit is thus purely a secondary function of the engine electronics unit.

The heat conduction path may include a heat pipe extending from the engine electronics unit to the manifold.

The heat conduction path may include a housing surrounding the manifold, the housing having a higher thermal conductivity than the manifold. The housing can be formed of aluminium or copper alloy. The manifold can be formed of stainless steel. For example, the pressure manifold may be made of stainless steel to provide a threaded coupling with a pressure pipe. The stainless steel manifold can then be recessed into an aluminium housing to provide an effective heat conduction path and even distribution of heat.

The engine electronics unit may be an electronic engine controller or an engine health monitoring unit.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
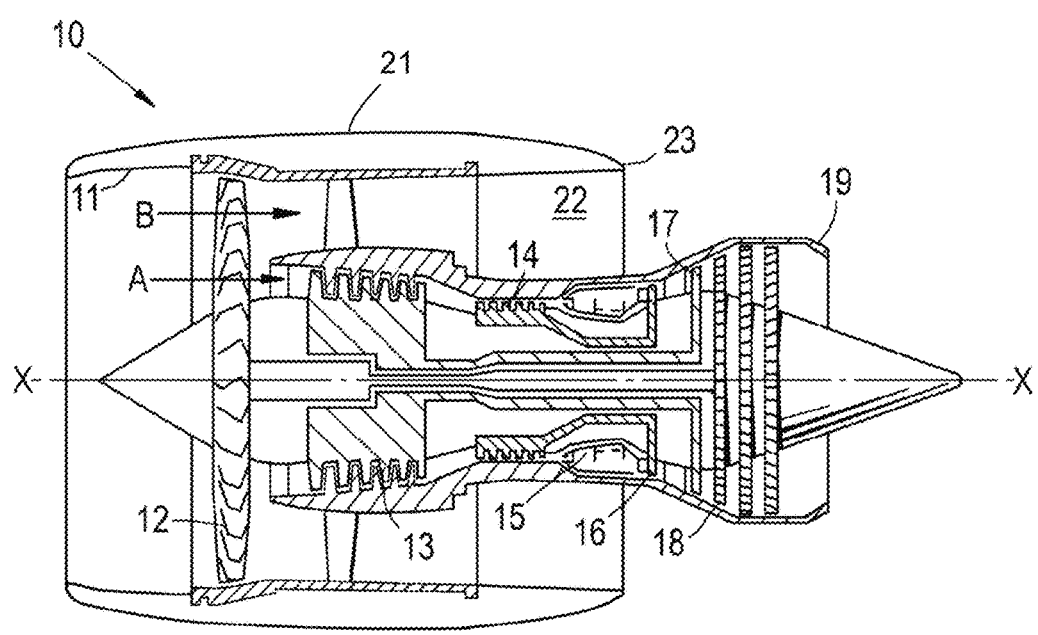
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The engine has an electronic engine controller (EEC). The total power requirement for an EEC is typically of the order of 50 W to 100 W, and this power generally needs to be conditioned, which produces conversion losses in the form of waste heat. With a typical total conversion efficiency of 70%, 15 W to 30 W of waste heat can thus be available.

Figure 2:
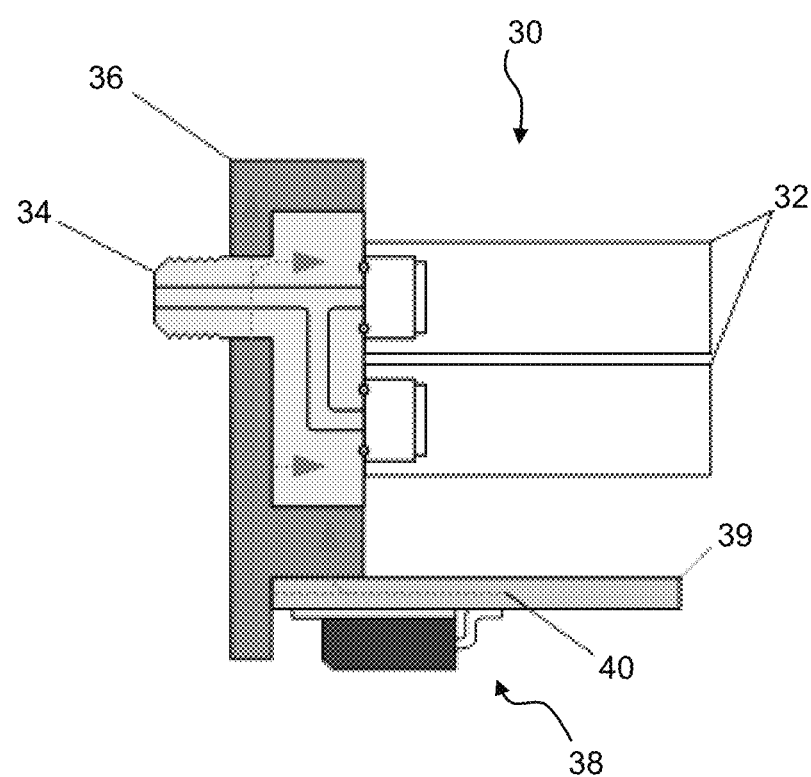
FIG. 2 shows a schematic cross-section through a combination of a pressure sensing assembly and an electronic engine controller.

FIG. 2 shows a schematic cross-section through a combination of a pressure sensing assembly 30 of the engine 10, and the EEC 38, the assembly using the EEC's waste heat to prevent icing. The pressure sensing assembly 30 includes pressure sensors 32 attached to outlets of pressure manifold 34. A threaded inlet to the pressure manifold 34 receives pneumatic pressure signals through an attached pressure pipe (not shown). The pressure manifold 34 is recessed in a housing 36 which is attached to the EEC 38.

Waste heat produced by the power supply of the EEC 38 is thus conducted through the housing 36 to pressure manifold 34 along a heat path 40 indicated by a dotted arrowed line.

The pressure manifold 34 can be made of stainless steel, while the housing 36 can be made of aluminium to provide a more effective heat conduction path and even distribution of heat. A power supply sub-unit 39 of the EEC 38 can be directly bonded to the aluminium housing to heat-sink the power supply while maintaining a temperature on the pressure manifold which avoids icing.

With this arrangement a need for ancillary heaters within the pressure sensors 32 can be avoided. The direct heating of the pressure manifold 34 mitigates the possibility of ice forming and blocking internal galleries of the manifold. The solution is passive and does not require monitoring of temperatures or switching of heating elements, avoiding a need for additional software or hardware control. Also thermal shock to pressure sensing elements is reduced. When operating in a higher temperature environment, power losses are still conducted to the pressure manifold 34, but the additional temperature rise at the pressure sensors 32 can be limited by providing a relatively poor conduction path from the pressure manifold 34 to the pressure sensors 32. This can be achieved, for example, by the use of stainless steel for the pressure manifold 34.

Figure 3:
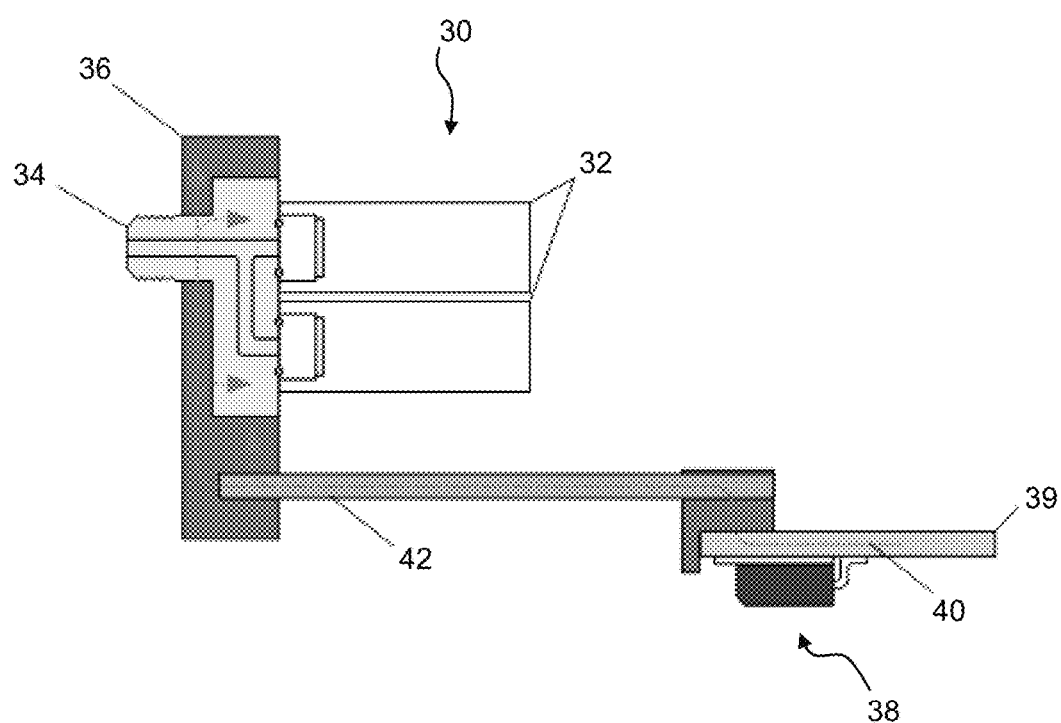
FIG. 3 shows a schematic cross-section through another combination of a pressure sensing assembly and an electronic engine controller.

FIG. 3 shows a schematic cross-section through another combination of the pressure sensing assembly 30 and the EEC 38. A heat pipe 42 extends from the EEC 38 to the housing 36 of the pressure manifold 34. Waste heat produced by the power supply of the EEC 38 is still conducted through to the housing 36, but now along an extended heat path 40 which includes the heat pipe 42.

While the invention has been described in conjunction with the exemplary embodiments described above, many equivalent modifications and variations will be apparent to those skilled in the art when given this disclosure. For example, the waste heat can be supplied by another engine electronics unit, such as a health monitoring unit. Accordingly, the exemplary embodiments of the invention set forth above are considered to be illustrative and not limiting. Various changes to the described embodiments may be made without departing from the spirit and scope of the invention.

What is claimed is:

1. A combination of a gas turbine engine pressure sensing assembly and an engine electronics unit, the pressure sensing assembly having:
   a pressure manifold having an air inlet and one or more air outlets; and
   one or more pressure sensors connected to the air outlets for sensing the pressure of air entering through the air inlet;
   wherein the engine electronics unit in operation produces waste heat; and
   the pressure sensing assembly further has a heat conduction path which thermally connects the engine electronics unit to the manifold such that the manifold acts as a sink for the waste heat, the heat conduction path including a housing surrounding the manifold, the housing having a higher thermal conductivity than the manifold, and the temperature rise of the manifold produced by the waste heat preventing icing of the manifold.

2. A combination according to claim 1, wherein the engine electronics unit is an electronic engine controller or an engine health monitoring unit.

3. A gas turbine engine having the combination of claim 1.

4. A method of preventing icing of a pressure manifold of a gas turbine engine pressure sensing assembly, the method including:
   providing the combination of claim 1; and
   using waste heat from the engine electronics unit to raise the temperature of the manifold.

5. A combination according to claim 1, wherein the heat conduction path includes a heat pipe extending from the engine electronics unit to the manifold.

6. A combination according to claim 1, wherein the engine electronics unit has a power supply sub-unit which produces the waste heat.

7. A combination of a gas turbine engine pressure sensing assembly and an engine electronics unit, the pressure sensing assembly having:
   a pressure manifold having an air inlet and one or more air outlets; and
   one or more pressure sensors connected to the one or more air outlets for sensing the pressure of air entering through the air inlet;
   wherein the engine electronics unit in operation produces waste heat;
   wherein the pressure sensing assembly further has a heat conduction path which thermally connects the engine electronics unit to the manifold such that the manifold acts as a sink for the waste heat, the heat conduction path including a housing surrounding the manifold, the housing having a higher thermal conductivity than the manifold, and the temperature rise of the manifold produced by the waste heat preventing icing of the manifold; and
   wherein the pressure manifold is located in a recess in the housing and contacts the housing at bottom and side surfaces of the recess.

8. A combination according to claim 7, wherein the engine electronics unit is an electronic engine controller or an engine health monitoring unit.

9. A gas turbine engine having the combination of claim 7.

10. A method of preventing icing of a pressure manifold of a gas turbine engine pressure sensing assembly, the method including:
providing the combination of claim 7; and
using waste heat from the engine electronics unit to raise the temperature of the manifold.

11. A combination according to claim 7, wherein the heat conduction path includes a heat pipe extending from the engine electronics unit to the manifold.

12. A combination according to claim 7, wherein the engine electronics unit has a power supply sub-unit which produces the waste heat.

13. A combination of a pressure sensing assembly and an engine electronics unit, the pressure sensing assembly having:
a pressure manifold having an air inlet and a plurality of air outlets; and
a first pressure sensor connected to a first air outlet and a second pressure sensor connected to a second air outlet, the first and second pressure sensors configured for sensing the pressure of air entering through the air inlet;
wherein the engine electronics unit in operation produces waste heat; and
wherein the pressure sensing assembly further has a heat conduction path which thermally connects the engine electronics unit to the manifold such that the manifold acts as a sink for the waste heat, the heat conduction path including a housing surrounding the manifold, the housing having a higher thermal conductivity than the manifold, and the temperature rise of the manifold produced by the waste heat preventing icing of the manifold.

14. A combination according to claim 13, wherein the engine electronics unit is an electronic engine controller or an engine health monitoring unit.

15. A combination according to claim 13, wherein the combination is configured in a gas turbine engine.

16. A method of preventing icing of a pressure manifold of a gas turbine engine pressure sensing assembly, the method including:
providing the combination of claim 13; and
using waste heat from the engine electronics unit to raise the temperature of the pressure manifold.

17. A combination according to claim 13, wherein the heat conduction path includes a heat pipe extending from the engine electronics unit to the pressure manifold.

18. A combination according to claim 13, wherein the engine electronics unit comprises a power supply sub-unit which produces the waste heat.

* * * * *